United States Patent
Caudill et al.

(10) Patent No.: US 8,565,096 B2
(45) Date of Patent: Oct. 22, 2013

(54) METHOD AND SYSTEM FOR ANALYZING RADIO PERFORMANCE DURING OVER-THE-AIR OPERATION

(75) Inventors: Danny Caudill, Melbourne, FL (US); Michael Keefe, West Melbourne, FL (US); Charna Parkey, Melbourne, FL (US); Robert Mitchell, Melbourne, FL (US); Murad Qahwash, Orlando, FL (US)

(73) Assignee: Locus Location Systems, LLC, West Melbourne, FL (US)

( * ) Notice: Subject to any disclaimer, the term of this patent is extended or adjusted under 35 U.S.C. 154(b) by 296 days.

(21) Appl. No.: 12/882,193

(22) Filed: Sep. 14, 2010

(65) Prior Publication Data
US 2011/0090807 A1 Apr. 21, 2011

Related U.S. Application Data

(60) Provisional application No. 61/252,693, filed on Oct. 18, 2009.

(51) Int. Cl.
*H04B 17/00* (2006.01)
*H04W 24/00* (2009.01)

(52) U.S. Cl.
USPC ..... 370/241; 370/252; 455/115.1; 455/67.11; 455/423

(58) Field of Classification Search
USPC ......... 370/241, 242, 248, 252, 328–330, 431, 370/464, 465, 468; 455/423, 115.1–115.4, 455/67.11, 67.14, 67.15, 67.7
See application file for complete search history.

(56) References Cited

U.S. PATENT DOCUMENTS

| | | | |
|---|---|---|---|
| 4,554,410 A | 11/1985 | Furumoto | |
| 5,973,643 A | 10/1999 | Hawkes | |
| 5,987,306 A | 11/1999 | Nilsen | |
| 6,308,065 B1 | 10/2001 | Molinari et al. | |
| 6,671,291 B1 | 12/2003 | Soliman | |
| 6,745,011 B1 | 6/2004 | Hendrickson | |
| 6,873,601 B1 * | 3/2005 | Chow et al. | 370/254 |
| 6,965,769 B2 | 11/2005 | Bims | |
| 7,346,346 B2 | 3/2008 | Lipsit | |
| 7,881,206 B2 * | 2/2011 | St. Pierre et al. | 370/238 |
| 7,913,182 B2 * | 3/2011 | Bear et al. | 715/778 |
| 8,000,700 B2 | 8/2011 | Choi et al. | |
| 2002/0009992 A1 | 1/2002 | Jensen | |
| 2002/0072359 A1 | 6/2002 | Moles | |

(Continued)

OTHER PUBLICATIONS

Written Opinion of the International Searching Authority dated Aug. 3, 2012 for International Application No. PCT/US12/37037.

*Primary Examiner* — Kerri Rose
(74) *Attorney, Agent, or Firm* — Mayback & Hoffman, P.A.; Gregory L. Mayback

(57) ABSTRACT

An apparatus for determining operating characteristics of radio-frequency (RF) transmitting devices while the devices are in normal operation transmitting over-the-air RF signals. The apparatus comprises at least one signal sensor for receiving the RF signals, each sensor responsive to the RF signals received at a plurality of antennas or received at a directional antenna, an analyzer for determining signal parameters of received RF signals and for determining operating characteristics of the transmitting devices from the signal parameters, wherein each RF signal includes an identifier of the transmitting device, the apparatus using the identifier to link operating characteristics determined from the RF signals to the transmitting device, and a graphical user interface for displaying the operating characteristics for each transmitting device.

22 Claims, 1 Drawing Sheet

(56) References Cited

U.S. PATENT DOCUMENTS

| | | |
|---|---|---|
| 2003/0061340 A1 | 3/2003 | Sun et al. |
| 2004/0032836 A1 | 2/2004 | Grilli et al. |
| 2004/0142699 A1* | 7/2004 | Jollota et al. ............... 455/452.2 |
| 2004/0203489 A1 | 10/2004 | Comerford |
| 2006/0003776 A1* | 1/2006 | Natori et al. ............... 455/456.3 |
| 2006/0030270 A1* | 2/2006 | Cheng ........................ 455/67.11 |
| 2006/0141998 A1 | 6/2006 | Kennedy et al. |
| 2006/0205398 A1 | 9/2006 | Seckendorf et al. |
| 2007/0178843 A1 | 8/2007 | Singh et al. |
| 2008/0095131 A1* | 4/2008 | Aljadeff et al. ............... 370/342 |
| 2008/0113623 A1* | 5/2008 | Gormley .................... 455/67.11 |
| 2009/0052330 A1 | 2/2009 | Matsunaga |
| 2009/0082009 A1 | 3/2009 | Nagy |
| 2009/0098867 A1 | 4/2009 | Varanda |
| 2009/0098868 A1 | 4/2009 | Cheng |
| 2009/0310501 A1 | 12/2009 | Catovic et al. |
| 2010/0020717 A1 | 1/2010 | McGregor et al. |
| 2010/0197299 A1 | 8/2010 | Huber |
| 2010/0254267 A1 | 10/2010 | Blackwell |
| 2010/0259448 A1* | 10/2010 | Qahwash et al. ............. 342/387 |
| 2011/0090807 A1 | 4/2011 | Caudill et al. |

* cited by examiner

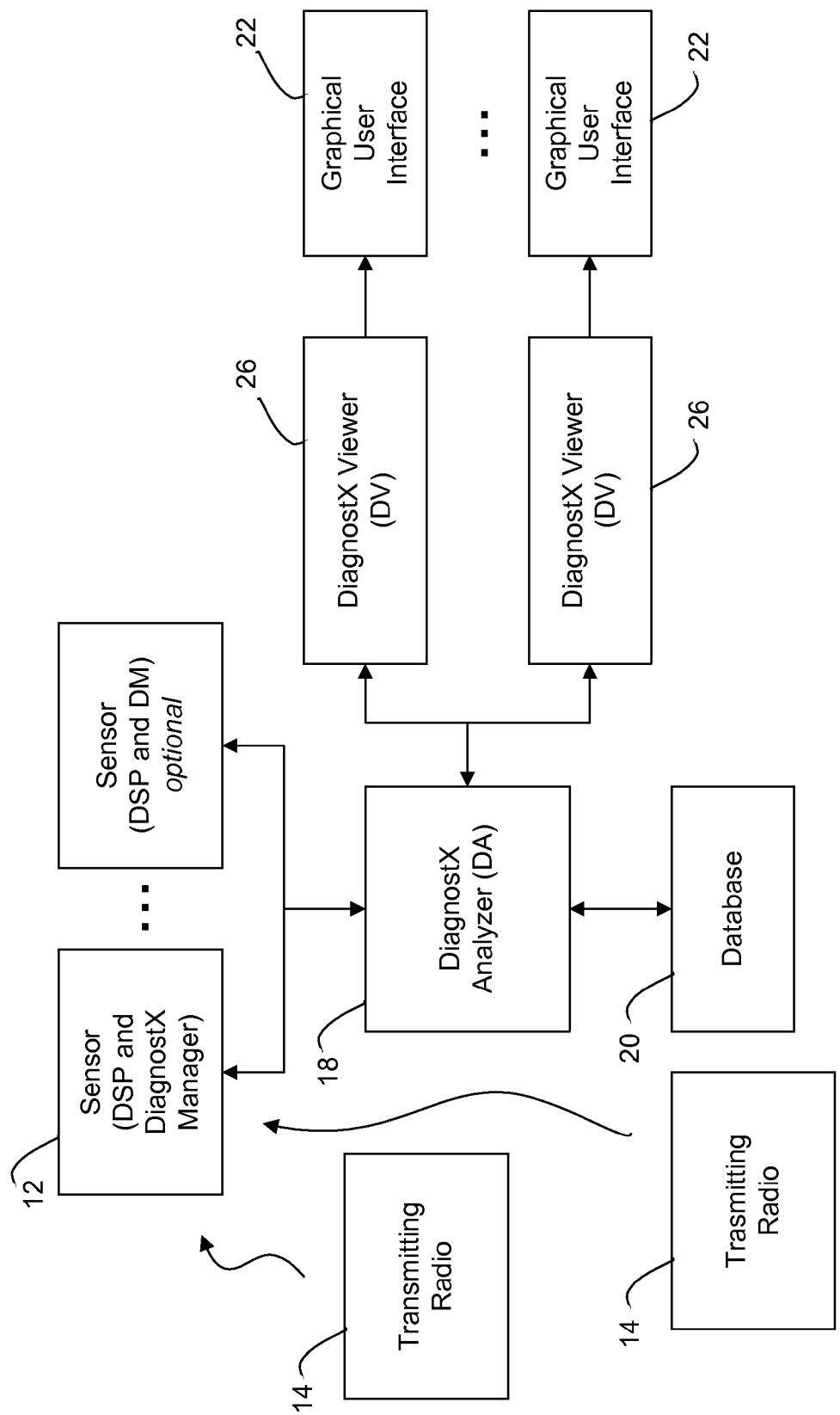

METHOD AND SYSTEM FOR ANALYZING RADIO PERFORMANCE DURING OVER-THE-AIR OPERATION

CROSS-REFERENCE TO RELATED APPLICATIONS

This patent application claims priority to the provisional application filed on Oct. 18, 2009, assigned application No. 61/252,693 and entitled Method and System for Analyzing Radio Performance During Over-The-Air Operation.

BACKGROUND OF THE INVENTION

The ability of a communications transmitting device to operate according to its specifications is crucial to proper communications between the transmitting device and the receiving device. Often the user does not realize the transmitting device is not operating according to its specification until it fails completely. When the device fails, it must be taken out of service, the problem diagnosed and the device repaired. The present invention overcomes this limitation by advising the user when a specification parameter is not met, although the device may continue to operate within the network at a degraded level.

BRIEF DESCRIPTION OF THE FIGURES

The present invention can be more easily understood and the advantages and uses thereof more readily apparent when the following detailed description of the present invention is read in conjunction with the figures wherein:

The FIGURE is a block diagram of the system of the present invention.

In accordance with common practice, the various described features are not drawn to scale, but are drawn to emphasize specific features relevant to the invention. Like reference characters denote like elements throughout the figures and text.

DETAILED DESCRIPTION OF THE INVENTION

Before describing in detail the particular method and system for analyzing performance of a radio or transmitting device during over-the-air operation according to the present invention, it should be observed that the present invention resides in a novel and non-obvious combination of structural elements and method steps. Accordingly, these elements have been represented by conventional elements and steps in the drawings and specification. The elements and process steps conventionally known in the art are described in lesser detail, and elements and steps pertinent to understanding the invention are described in greater detail. The following preferred embodiments are an application of the present invention and are not intended to define limits of the structure or use of the invention, but only to provide exemplary constructions. Many variations can be made to the design within the scope of the presented claims.

The present invention determines the "health" of a transmitting device (e.g., a mobile, portable or stationary transmitter or transceiver) that emits a radio frequency signal for receiving by a receiving device (e.g., a receiver, a transceiver), including transmitting and receiving devices operating in a network. The network may include, but is not limited to, a WiFi network, a trunked radio network, a cellular telephone network, a paging network, a WiMax network, an 802.11x network and a Zigbee network. The teachings of the invention can be applied to transmitting and receiving devices operating in digital and analog networks (where the analog networks include such devices as conventional two-way radios and AM or FM transmitters).

The "health" of each device, which is important to ensure that a user can effectively communicate with others in the network, is determined while the device is in an over-the-air operating mode. Bench tests for transmitting devices are known in the repair art. Unlike the known art, the present invention does not require removing the device from active service to evaluate the "health" of the device. Instead, the present invention allows a network operator or a device user to assess the "health" of the device during normal operation.

When used in the present application, the "health" of a device refers to its performance in accordance with applicable performance specifications as determined by the device manufacturer or as determined by the user or network provider. That is, the network provider may require tighter tolerances for certain operational parameters due to the characteristics of its network.

A failed component or other element of the device may degrade its performance and/or cause its parameters to vary from the specification values. A significant degradation or a significant variation from the specification may prevent the device from communicating with other devices on the network. According to the present invention, the transmitting devices are tested during over-the-air operation and any variance from the applicable specifications is identified. The device can then be removed from service for repair.

As used herein the term "radio" refers to any transceiver (or transmitter) transmitting or transmitting and receiving RF signals. Mobile and portable transceivers used in public safety trunked networks are commonly referred to as radios.

One application of the present invention applies to radios operating in a trunked radio system that includes a location-determining subsystem for determining the location of any transmitting radio. In this application, the "health" of each radio is important to accurately locate the radio and its operator.

The teachings of the invention can be employed by a network operator to determine the "health" of transmitting devices operating within its network or the "health" of a transmitting device can be determined irrespective of any network in which the transmitting device operates. Use of the system of the invention can identify incipient and real-time transmitting device problems to reduce both transmitting device and network downtime, improve the "health" of the network, increase network capacity and improve other aspects of network performance (e.g., location accuracy for a transmitting device operating in a radio-location system).

To identify incipient problems, the user (or network operator) can set a relatively tight tolerance for transmitting device operation; any performance parameters outside this range, while not indicative of a failure, may be evidence of a potential problem. Thus parameters outside the user-defined range may trigger an incipient problem alert.

The invention can also determine whether a transmitting device is operating according to pertinent regulations promulgated by a regulatory agency, such as the U.S. Federal Communication Commission or similar regulatory agencies of other countries. These regulations dictate the operating requirements of both licensed and unlicensed transmitting devices. The invention can also determine if a transmitting device operates within its published specifications, apart from any applicable government regulations.

The system and method of the present invention (commercially referred to as a DiagnostX System) is a field diagnostic tool that verifies and/or determines the "health" of transmitting devices using over-the-air transmissions from the transmitting devices. For example, when a radio in a trunked radio network transmits (on an inbound channel), a request for a working channel (i.e., the channel or frequency for carrying a subsequent communication with another radio in the network) to a network controller, the system of the invention captures the transmitted waveform on the inbound channel and analyzes the waveform for possible failures, problems or out-of-spec parameters. The system can also listen to the outbound control channel (over which the radio is advised to a working channel by the network controller) and follow the radio to its assigned working channel to capture and analyze working channel transmissions.

The system of the present invention captures inbound and outbound control channel signals and working channel signals to measure operational characteristics of the radio when operating in a transmitting mode and to detect potential radio transmission problems. The trunked radio system operator can remove the radio from service for repair or undertake other maintenance actions as deemed advisable. The signal measurement and analysis features of the invention are intended to reduce radio failures in the field and to identify suspect radios before they fail. When used in conjunction with a location-determining system, the present invention also improves the accuracy of the determined locations by ensuring that each radio is operating according to its specifications. As applied to the trunked radio system, a better operating radio can also reduce the number of control channel retries and therefore increase the system throughput or capacity.

Generally, one parameter determined by the system of the invention is a received signal strength indicator (RSSI) value. This value must exceed a minimum RSSI to permit meaningful analysis of the signal parameters and transmitter operating characteristics as determined by the present invention. In one embodiment the minimum value is −95 dBm. Signals with RSSI values less than −95 dBm can be ignored or if analyzed can be notated with an indication that the RSSI value was below the required minimum value.

To set up the radio diagnostic system, an identifier for each radio is entered into the database. The operating characteristics or parameters are also entered manually or selected from a presented menu. These specifications for individual radios are determined by the operating for that radio, e.g., transmission type, protocol type. For example, each protocol may have a different specification and a different range of permitted deviations from that specification. Further, a first specification range may be established to identify potential problem radios. An operational parameter within the first range indicates a suspect radio. A second specification range may be established to identify failed radios. An operational parameter within the second range indicates a failed radio that should be immediately removed from service for repair.

The FIGURE illustrates a block diagram of the system of the invention. The system includes one or more signal sensors (referred to as a DSP and DiagnostX Manager (DM) in the FIG. 12 that receive RF signals from transmitting radios 14 and measures characteristics of the signal to extract desired operational metrics or operating characteristics of that radio. In one embodiment of the invention, each receiving site or sensor in a network employs at least one directional antenna or a plurality of antennas that provide diversity reception and may thereby increase a signal strength of a received signal. Each sensor further includes, in an addition to the at least one antenna, a receiver, a digital signal processor, a precision oscillator and a general purpose processor. These devices cooperate, under control of the processor, to measure various signal parameters of the transmitted signal as required to extract the transmitter operating characteristics, as identified below.

An identifier associated with each radio and included in each signal transmitted by that radio is used to link the determined transmitter operating characteristics to the transmitting radio.

A database 20 stores the radio identifiers for radios to be monitored (and in one embodiment a list of identifiers for radios that are not to be monitored). The database 20 stores the pertinent specifications, desired operating characteristics and specifications ranges for each radio. The database also stores the actual operating characteristics for each radio, where the actual operating characteristics are determined from the signals transmitted from the pertinent radio as those signals are received and analyzed by the system of the present invention.

The sensor measurements are input to a DiagnostX Analyzer (DA) 18 that performs calculations and determines whether the signal measurements indicate that one or more operating characteristics of the radio exceed the pertinent specification ranges for that radio. When certain ranges are exceeded the radio may be flagged as suspect and when other ranges are exceeded this may warrant flagging the radio as failed.

Results from the DA 18 are displayed on a graphical user interface (GUI) 22 under control of a DiagnostX Viewer (DV) 26 that pulls data for the GUI 22 from the DA 18 and the database 20. For example, the GUI 22 may display a radio identifier and signal measurements associated with the identified radio. The system can also identify (highlight) and display pertinent information for any radio with potential or incipient problems, including a general textual description of the problem.

From the DA 18, the analysis results are also stored in the database 20 for later retrieval and/or additional analysis. The database 20 can be searched by radio identification number to retrieve performance data for selected radios.

After a radio has been repaired, the collected performance parameters can be cleared from the database 20 as they are no longer relevant after radio repair.

The system can also target specific radios for additional and more detailed over-the-air or bench analysis. Such radios can also be identified in the database 20. In one embodiment, performance data for the targeted radios can be collected more frequently than the other radios in the database.

The system generates, displays, and prints numerous reports including but not limited to:
  Good radios, i.e., those that satisfy predefined operating thresholds or satisfy associated specifications
  Suspect radios as determined from standard industry conformance testing and operational specifications.
  Radios emitting a weak signal, where weak is defined as an RSSI below a predetermined threshold or below the specification for the associated radio.
  Radios with an insufficient number of transmissions to permit an accurate determination of the radio's health.
  Radios not in regular use
  Other reports according to user-defined subject matter
  Waveform visualization
  Bit-field visualization (i.e. a packet sniffer)

An analysis of the received signal and its waveform provides information on the operational aspects of each radio, including but not limited to the following operational attributes.

RF frequency accuracy
RF frequency offset (i.e., offset from an assigned frequency)
Timing of RF frequency offsets relative to a beginning of a message
RF frequency offset variations throughout a message
Frequency deviation of the modulated signal (i.e., the difference between the center frequency of the received signal and the modulated frequency)
Range of frequency deviations over time
Maximum frequency deviation
Unexpected amplitude variations during a message
Symbol Frequency Error
Symbol Clock Error
Modulation Fidelity
Bit Error Rate
Conformance to packet structure specifications
Baud rate changes during a message
Spurious emissions
Received signal strength indicator (RSSI)
Consistent low power level irrespective of radio location
High bit error rate irrespective of radio location
Battery charge
Probable emission mask non compliance
Communication retries that exceed a user-defined threshold (as applied to a trunked network). This parameter can also be determined with respect to a specific receiving site in a trunked network, i.e., whether a specific site on the network is experiencing a substantial number of retries.
An unexpectedly low received signal strength based on the location of the radio and the location of the receiving sensor To assist with the analysis of each radio, the operator can define different operational metric thresholds (e.g., frequency offset, frequency deviation) for one or more radios by reference to the radio identifier. This feature thus allows different thresholds to be established for different radios in the network. The system can also rank the radios from those with the best performance to those with the worst.

A radio exhibiting an operating measurement that exceeds a threshold is indicated on the GUI 22. These radios may be classified as suspect or failed. In one embodiment the number of analyzed transmissions and the time period over which the data is collected must satisfy minimum thresholds before the radio can be identified as suspect or failed.

The system operator can also determine and configure the system with the length of time the historical operational data is stored (e.g., a storage time parameter such as last year, last six months, etc.), the frequency at which the performance data is collected (e.g., one daily performance snapshot, weekly, monthly) and the performance data measured during each snapshot.

The system can generate and send e-mail alerts to users and system operators. For example, each morning an email listing the worst performing or suspect radios can be sent to system operators or to the user of each listed transmitting device. The users of the listed radios and the system operators should consider these radios when communicating with or trying to locate any of the listed radios. The alert criteria are also user-defined (e.g., frequency of emails, email distribution list).

If the system operator is interested in the performance of only a subset of the radios, the operator generates a list of the radios and configures the system to monitor the performance of only the listed radios.

The system can also store and display:
A minimum RSSI threshold (e.g., −95 dBm or greater) before operational data is collected
A median calculation on the collected data to statistically eliminate any outliers for a radio.
Radio repair dates tied to a radio identifier (preferably a radio serial number or another unique radio identifier). A repair technician enters the radio identifier into the system before beginning the repair and a system-generated date is used as the repair date. When a repair date is entered the historical performance data and all radio transmissions are cleared
A suspect radio can be cleared of all recorded performance measurements and events to restart the collection and evaluation process for the radio. The system-generated date/time is used as the "clear" date
Store the previous n performance data measurements for every radio
Maintain lists and pertinent data that indicate the health of each radio according to the parameters that the user or system operator defines for a suspect, failed and a properly operating radio. For example, the lists can indicate a radio always transmitting signals below a user-defined RSSI threshold, above a user-defined threshold but based on fewer than n measurements, and a subjective judgment as to the radio's health (e.g., good or suspect) and the metrics on which the judgment is based. The user or system operator can also define the contents of any list and data reporting requirements for any radio.
Generate or use an operator-provided list of radio identification information that identifies radios for which performance data has not been collected
Ensure the radios meet FCC mandated performance requirements
Install software updates or synthetic instrumentation via an Internet connection or manually from a CD or USB drive When a signal from a radio is detected (referred to as an event), radio identification information, date and time information, and measured operational characteristics for that radio are determined and stored. The operational parameters are analyzed to determine the "health" of the radio. Tracking the time the event is recorded allows the system to time-align events if multiple sensors are used to record the radio performance data.

The system can track radios by serial number, radio ID, or another unique identifier. This is useful in systems where radios are reconfigured with different identifiers because it allows all historical performance information to link to the same physical radio.

In one embodiment, after a location of the radio is determined, by a radio-location system separate from the diagnosis system of the invention, the RSSI value can be used as one parameter to assess the "health" of the radio. Other parameters that are location-dependent can also be used once the location has been determined.

Although the invention has been shown and described with respect to a certain preferred embodiment or embodiments, it is obvious that equivalent alterations and modifications will occur to others skilled in the art upon the reading and understanding this specification and the annexed drawing. In particular regard to the various functions performed by the above described components (assemblies, devices, circuits, etc.), the terms used to describe such components are intended to correspond, unless otherwise indicated, to any component that performs the specified function of the described component (i.e., that is functionally equivalent), even though not structurally equivalent to the disclosed structure that performs the function in the illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. An apparatus for determining operating characteristics of radio-frequency (RF) transmitting devices while the devices are in normal operation transmitting over-the-air RF signals each including an identifier of the transmitting device, the apparatus comprising:
    at least one RF signal sensor receiving the RF signals, the at least one sensor responsive to the RF signals received;
    an analyzer measuring signal parameters of received RF signals and determining operating characteristics of the transmitting devices from the signal parameters, the analyzer:
        using the identifier from the received RF signals to correlate operating characteristics to the particular one of the transmitting devices; and
        collecting operating characteristics for identified transmitting devices more frequently than operating characteristics for other transmitting devices; and
    a graphical user interface displaying the operating characteristics for each transmitting device.

2. The apparatus according to claim 1, wherein the analyzer further determines one or more:
    transmitting devices satisfying predefined operating thresholds;
    transmitting devices satisfying specifications applicable to the transmitting device;
    suspect transmitting devices;
    transmitting devices transmitting a signal having an RSSI below a predetermined threshold;
    transmitting devices transmitting a signal having an RSSI below the specification applicable to the transmitting device;
    transmitting devices having an insufficient number of transmissions from which to determine operating characteristics of the transmitting device;
    transmitting devices not in regular use;
    transmitting device reports according to user-defined topics;
    waveform visualization information; and
    bit-field visualization information.

3. The apparatus according to claim 1, wherein, responsive to the analyzer, the graphical user interface identifies transmitting devices that have failed and transmitting devices that are suspect.

4. The apparatus according to claim 1, wherein the signal parameters comprise at least one of RF frequency accuracy, RF frequency offset from an assigned frequency, timing of RF frequency offsets relative to a beginning of a message transmission, RF frequency offset variations throughout a message transmission, frequency deviation of the modulated signal, range of frequency deviations over time, amplitude variations during a message transmission, symbol frequency error, symbol clock error, modulation fidelity, bit error rate, conformance to packet structure specifications, baud rate changes during a message transmission, spurious emissions, RSSI, consistent low power level irrespective of location of the transmitting device, high bit error rate irrespective of location of the transmitting device, battery charge, a number of retries over a predetermined threshold, and unexpectedly low RSSI.

5. The apparatus according to claim 1, wherein the analyzer is configured with a storage time parameter identifying a period of time for storing the operating characteristics and configured with a data collection frequency parameter identifying a frequency at which the operating characteristics are determined.

6. The apparatus according to claim 1, wherein the analyzer includes a list of identifiers of transmitting devices for which signal parameters are to be determined.

7. The apparatus according to claim 1, wherein the frequency of monitoring and analyzing the signal parameters is user-defined for each transmitting device.

8. The apparatus according to claim 1, wherein:
    the transmitting device comprises a transmitting device operating in a trunked network; and
    the analyzer monitors at least one of a request from the transmitting device to a network controller for an inbound channel, a message from the network controller advising the transmitting device of an assigned inbound channel, and an inbound channel carrying transmissions from the transmitting device.

9. The apparatus according to claim 1, wherein:
    the analyzer operates in conjunction with a location-determining system determining a location of the transmitting devices in a trunked radio network; and
    the analyzer advises the location-determining system of the performance of the transmitting devices in the trunked radio network.

10. The apparatus according to claim 1, wherein the transmitting device comprises a mobile, portable or stationary transmitting device or a mobile, portable, or stationary transceiver.

11. The apparatus according to claim 1, wherein the transmitting device is operative in a communications network selected from at least one of a WiFi network, a trunked transmitting device network, a cellular telephone network, a paging network, a WiMax network, an 802.11x network, and a Zigbee network.

12. The apparatus according to claim 1, wherein the device transmits signals in at least one of digital and analog formats.

13. The apparatus according to claim 1, wherein the at least one RF signal sensor comprises at least one antenna, a receiver, a digital signal processor, a precision oscillator and a general purpose processor cooperating to measure signal parameters of the RF signals from which the operating characteristics of the transmitting device are determined.

14. An apparatus for determining operating characteristics of radio-frequency (RF) transmitting devices while the devices are in normal operation transmitting over-the-air RF signals each including an identifier of the transmitting device, the apparatus comprising:
    at least one RF signal sensor receiving the RF signals, the at least one sensor responsive to the RF signals received at one or more antennas or received at a directional antenna;
    an analyzer measuring signal parameters of received RF signals and determining operating characteristics of the transmitting devices from the signal parameters, the analyzer:
        using the identifier from the received RF signals to correlate operating characteristics to the particular one of the transmitting devices; and
        modifying predefined operating thresholds for a transmitting device responsive to a determined location for the transmitting device; and
    a graphical user interface displaying the operating characteristics for each transmitting device.

15. The apparatus according to claim 14, wherein:
the analyzer operates in conjunction with a location-determining system determining a location of the transmitting devices in a trunked radio network; and
the analyzer advises the location-determining system of the performance of the transmitting devices in the trunked radio network.

16. An apparatus for determining operating characteristics of radio-frequency (RF) transmitting devices while the devices are in normal operation transmitting over-the-air RF signals each including an identifier of the transmitting device, the apparatus comprising:
at least one RF signal sensor receiving the RF signals, the at least one sensor responsive to the RF signals received;
an analyzer measuring signal parameters of received RF signals and determining operating characteristics of the transmitting devices from the signal parameters, the analyzer using the identifier from the received RF signals to correlate operating characteristics to the particular one of the transmitting devices;
a graphical user interface displaying the operating characteristics for each transmitting device; and
a component issuing email messages including the operating characteristics for identified transmitting devices.

17. An apparatus for determining operating characteristics of radio-frequency (RF) transmitting devices while the devices are in normal operation transmitting over-the-air RF signals each including an identifier of the transmitting device, the apparatus comprising:
at least one RF signal sensor receiving the RF signals, the at least one sensor responsive to the RF signals received;
an analyzer measuring signal parameters of received RF signals and determining operating characteristics of the transmitting devices from the signal parameters, the analyzer using the identifier from the received RF signals to correlate operating characteristics to the particular one of the transmitting devires;
a graphical user interface displaying the operating characteristics for each transmitting device; and
a component issuing email alerts identifying failed or suspect transmitting devices.

18. An apparatus for determining operating characteristics of radio-frequency (RF) transmitting devices while the devices are in normal operation transmitting over-the-air RF signals each including an identifier of the transmitting device, the apparatus comprising:
at least one RF signal sensor receiving the RF signals, the at least one sensor responsive to the RF signals received;
an analyzer measuring signal parameters of received RF signals and determining operating characteristics of the transmitting devices from the signal parameters, the analyzer:
using the identifier from the received RF signals to correlate operating characteristics to the particular one of the transmitting devices; and
determining a "health" of at least one of the transmitting devices by comparing the operating characteristics of the at least one transmitting device with performance specifications for the at least one transmitting device; and
a graphical user interface displaying the operating characteristics for each transmitting device.

19. An apparatus for determining operating characteristics of radio-frequency (RF) transmitting devices while the devices are in normal operation transmitting over-the-air RF signals each including an identifier of the transmitting device, the apparatus comprising:
at least one RF signal sensor receiving the RF signals, the at least one sensor responsive to the RF signals received;
an analyzer measuring signal parameters of received RF signals and determining operating characteristics of the transmitting devices from the signal parameters, the analyzer:
using the identifier from the received RF signals to correlate operating characteristics to the particular one of the transmitting devices; and
determining a "health" of at least one of the transmitting devices by comparing the operating characteristics of the at least one transmitting device with governmental regulations applicable to performance of the at least one transmitting device; and
a graphical user interface displaying the operating characteristics for each transmitting device.

20. An apparatus for determining operating characteristics of radio-frequency (RF) transmitting devices while the devices are in normal operation transmitting over-the-air RF signals each including an identifier of the transmitting device, the apparatus comprising:
at least one RF signal sensor receiving the RF signals, the at least one sensor responsive to the RF signals received;
an analyzer measuring signal parameters of received RF signals and determining operating characteristics of the transmitting devices from the signal parameters, the analyzer using the identifier from the received RF signals to correlate operating characteristics to the particular one of the transmitting devices;
a graphical user interface displaying the operating characteristics for each transmitting device; and
a database storing information related to the operating characteristics, the information comprising one or more of statistics related to the operating characteristics for a transmitting device, past repair dates for a transmitting device, transmitting devices for which no operating characteristics have been determined, and user-defined information.

21. An apparatus for determining operating characteristics of radio-frequency (RF) transmitting devices while the devices are in normal operation transmitting over-the-air RF signals each including an identifier of the transmitting device, the apparatus comprising:
at least one RF signal sensor receiving the RF signals, the at least one sensor responsive to the RF signals received;
an analyzer measuring signal parameters of received RF signals and determining operating characteristics of the transmitting devices from the signal parameters, the analyzer using the identifier from the received RF signals to correlate operating characteristics to the particular one of the transmitting devices;
a graphical user interface displaying the operating characteristics for each transmitting device; and
a database from which the operating characteristics for a transmitting device are deleted after the transmitting device is repaired.

22. A method for determining operating characteristics of a radio-frequency (RF) transmitting device while the device is in normal operation transmitting over-the-air RF signals each including an identifier of the transmitting device, the method comprising:
receiving the RF signals at at least one signal sensor responsive to the RF signals received;
measuring signal parameters of received RF signals;
determining operating characteristics of the transmitting device from the signal parameters;

using the identifier from the received RF signals to correlate operating characteristics to the particular one of the transmitting devices;

collecting operating characteristics for identified transmitting devices more frequently than operating characteristics for other transmitting devices; and displaying the operating characteristics for the transmitting device on a graphical user interface.

\* \* \* \* \*

UNITED STATES PATENT AND TRADEMARK OFFICE
CERTIFICATE OF CORRECTION

PATENT NO. : 8,565,096 B2  
APPLICATION NO. : 12/882193  
DATED : October 22, 2013  
INVENTOR(S) : Danny Caudill et al.

Page 1 of 1

It is certified that error appears in the above-identified patent and that said Letters Patent is hereby corrected as shown below:

In the specification:
In column 3, line 45, after "operating" add --characteristics--
In column 3, line 56, after "sensors" add --12--
In column 3, line 58, replace "FIG. 12" with --FIGURE)--
In column 3, line 59, replace "measures" with --measure--
In column 3, line 60, after "radio" add --14--
In column 9, line 37, replace "devires" with --devices--

Signed and Sealed this
Thirteenth Day of October, 2015

Michelle K. Lee
*Director of the United States Patent and Trademark Office*